United States Patent
Zhe et al.

(10) Patent No.: US 7,999,201 B2
(45) Date of Patent: Aug. 16, 2011

(54) MEMS G-SWITCH DEVICE

(75) Inventors: Wang Zhe, Singapore (SG); Xin Ping Cao, Singapore (SG)

(73) Assignee: Shandong Gettop Acoustic Co. Ltd., Shandong, P.R. (CN)

( * ) Notice: Subject to any disclaimer, the term of this patent is extended or adjusted under 35 U.S.C. 154(b) by 321 days.

(21) Appl. No.: 12/291,106

(22) Filed: Nov. 6, 2008

(65) Prior Publication Data

US 2010/0108478 A1 May 6, 2010

(51) Int. Cl.
*H01H 35/14* (2006.01)

(52) U.S. Cl. .............................. 200/61.45 R; 73/514.16

(58) Field of Classification Search . 200/61.45 R–61.45 M; 73/514.01, 514.02, 514.16–514.18, 514.23, 73/514.24, 514.35, 514.38

See application file for complete search history.

(56) References Cited

U.S. PATENT DOCUMENTS

| | | | |
|---|---|---|---|
| 5,177,331 A * | 1/1993 | Rich et al. | 200/61.45 R |
| 5,211,051 A * | 5/1993 | Kaiser et al. | 73/1.38 |
| 5,353,641 A * | 10/1994 | Tang | 73/514.18 |
| 6,035,694 A | 3/2000 | Dupuie et al. | |
| 6,230,564 B1 * | 5/2001 | Matsunaga et al. | 73/514.01 |
| 6,236,005 B1 * | 5/2001 | Kvisteroey et al. | 200/61.45 R |
| 6,327,909 B1 * | 12/2001 | Hung et al. | 73/514.16 |
| 6,550,330 B1 | 4/2003 | Waters et al. | |
| 6,765,160 B1 | 7/2004 | Robinson | |
| 6,964,195 B2 * | 11/2005 | Hobbs et al. | 73/504.14 |
| 7,284,432 B2 * | 10/2007 | Tay et al. | 73/514.32 |
| 7,312,553 B2 * | 12/2007 | Laermer | 310/312 |
| 7,316,186 B1 | 1/2008 | Robinson et al. | |
| 7,355,318 B2 * | 4/2008 | Dean et al. | 310/309 |
| 2003/0140699 A1 | 7/2003 | Pike et al. | |
| 2005/0253710 A1 * | 11/2005 | Eskildsen | 340/545.5 |
| 2006/0161211 A1 | 7/2006 | Thompson et al. | |

* cited by examiner

*Primary Examiner* — Michael A Friedhofer
(74) *Attorney, Agent, or Firm* — Saile Ackerman LLC; Stephen B. Ackerman; Rosemary L. S. Pike

(57) ABSTRACT

A Micro Electro Mechanical Systems (MEMS) G-switch includes one or more actuators formed between fixed driving stages and moveable driving stages. A proof mass is attached to the moveable driving stages and flexibly attached to a substrate through one or more spring members. A voltage control circuit applies working voltages to the driving stages. With a first working voltage applied between the moveable and the fixed driving stages, moving of the driving stages' sensing direction towards gravity at a first critical angle will cause moveable driving stages to collapse and touch the fixed driving stage on the substrate and thus turn on the MEMS G-switch. After turning on the G-switch, a second working voltage is applied and moving of the driving stages' sensing direction away from gravity at a second critical angle will cause moveable electrodes to deviate from the fixed electrodes and thus turn off the MEMS G-switch.

29 Claims, 4 Drawing Sheets

US 7,999,201 B2

MEMS G-SWITCH DEVICE

BACKGROUND OF THE INVENTION (1) Field of the Invention

The invention relates to MEMS G-switches, and more particularly, to a MEMS structure having a larger capacitance when the MEMS G-switch is turned on and a smaller capacitance when the MEMS G-switch is turned off.

(2) Description of the Related Art

Micro-electro-mechanical systems (MEMS) are devices which may be fabricated using semiconductor thin film technology in order to reduce the characteristic dimensions and, thus, the cost of the devices. MEMS have been spotlighted recently because of their increasing application to a wider range of fields. Many micro-mechanical sensing devices are now well known. Such devices include sensors of all types. These devices are termed "micro-mechanical" because of their small dimensions on the order of a few centimeters square or smaller. The small size is generally achieved by employing photolithographic technology similar to that employed in the fabrication of integrated circuit (IC) dies. With this technology, the devices are as small as microelectronic circuits, and many such devices are often fabricated in a batch on a single substrate, thereby dividing the cost of processing among many individual devices. The resulting low unit cost increases the application for such devices.

The MEMS G-switch is one of the physiological sensing or intelligent monitoring devices providing miniature, lightweight and ultra-low power as required for health monitoring applications or consumer electronics, for example.

U.S. Pat. No. 6,765,160 (Robinson) discloses a G-switch that is closed when a proof mass makes contact with a bottom ring electrode. U.S. Pat. No. 7,316,186 (Robinson et al) describes a submunition having a MEMS G-switch that closes upon impact. U.S. Pat. No. 6,035,694 (Dupuie et al) describes calculating stray capacitance by sensing the position of a MEMS proof mass. U.S. Pat. No. 6,550,330 (Waters et al) and U.S. Patent Applications 2006/0161211 (Thompson et al) and 2003/0140699 (Pike et al) disclose various MEMS accelerometers.

SUMMARY OF THE INVENTION

A principal object of the present invention is to provide a cost-effective and very manufacturable method of fabricating a highly reliable MEMS G-switch.

Another object of the invention is to provide a highly reliable MEMS G-switch.

In accordance with the objects of this invention an improved MEMS G-switch device is achieved. The MEMS G-switch device has a proof mass flexibly attached to a substrate. The device includes one or more actuator driving stages comprising fixed driving stages on the substrate and moveable driving stages attached to the proof mass. The proof mass is connected to the substrate through one or more spring elements which can be specially designed and optimized. A voltage control circuit applies voltage between the moveable driving stages and the fixed driving stages wherein two different working voltages are generated by the voltage control circuit when the G-switch turns on and off.

Also in accordance with the objects of the invention, a MEMS G-switch is achieved comprising a substrate, a proof mass suspended by a spring member, a fixed driving stage attached to the substrate, a moveable driving stage attached to the proof mass, and a bump attached between the fixed and moveable driving stages. When the MEMS G-switch is turned off, a first working voltage is applied to the moveable driving stage, thereby moving the sensing direction of the moveable driving stage toward gravity at a first critical angle, and turning on the MEMS G-switch. When the MEMS G-switch is turned on, a second working voltage, which is lower than the first working voltage, is applied to the moveable driving stage, thereby moving the sensing direction of the moveable driving stage away from gravity at a second critical angle, turning off the MEMS G-switch.

Also in accordance with the objects of the invention, a MEMS G-switch is achieved comprising a substrate, a proof mass suspended onto said substrate, one or more fixed driving stages attached to the substrate, one or more moveable driving stages attached to the proof mass, and one or more bumps attached either to the fixed driving stage or to the moveable driving stage. When the MEMS G-switch is turned off, a first working voltage is applied to the one or more moveable driving stages, thereby moving the moveable driving stages' sensing direction towards gravity at a first critical angle will turn on the MEMS G-switch. When the MEMS G-switch is turned on, a second working voltage is applied to the one or more moveable driving stages, thereby moving of the sensing direction of the moveable driving stages' sensing direction away from gravity at a second critical angle will turn off the MEMS G-switch.

Also in accordance with the objects of the invention, a method for manufacturing a MEMS G-switch is achieved. A substrate is provided. A proof mass is formed in or above the substrate. One or more fixed driving stages are attached to the substrate. One or more moveable driving stages are attached to the proof mass. A plurality of mechanical springs is provided to suspend the one or more moveable driving stages above the substrate. One or more bumps are attached between the fixed and moveable driving stages. A voltage control circuit is provided to control two working voltages applied to the one or more driving stages alternatively when the G-Switch turns on and off.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. In the accompanying drawings forming a material part of this description, there is shown.

DESCRIPTION OF THE PREFERRED EMBODIMENTS

Figure 1A:
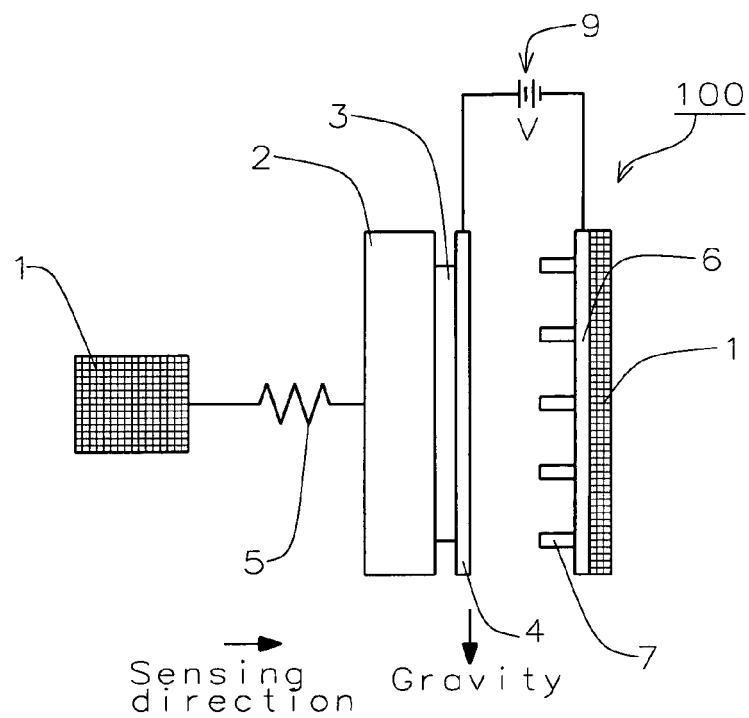
FIGS. 1A and 1B are schematic diagrams of a G-switch embodiment configured as a G-switch turned off in the horizontal direction and turned on in the vertical direction according to a first preferred embodiment of the present invention.

The present invention can be viewed as providing principles for designing MEMS G-switches. Other systems, methods, features, and advantages of the present invention will be or will become apparent to one skilled in the art upon examination of the following drawings and detailed description. It is intended that all such additional systems, methods, features, and advantages be included within this description, be within the scope of the present invention, and be protected by accompanying claims.

Hereinafter, the present invention will be described in detail with reference to the accompanying drawings. Common constituent elements will be explained with like reference numerals throughout the disclosure. The described exemplary embodiments are intended to assist in understanding the invention and are not intended to limit the invention in any way.

Figure 1B:
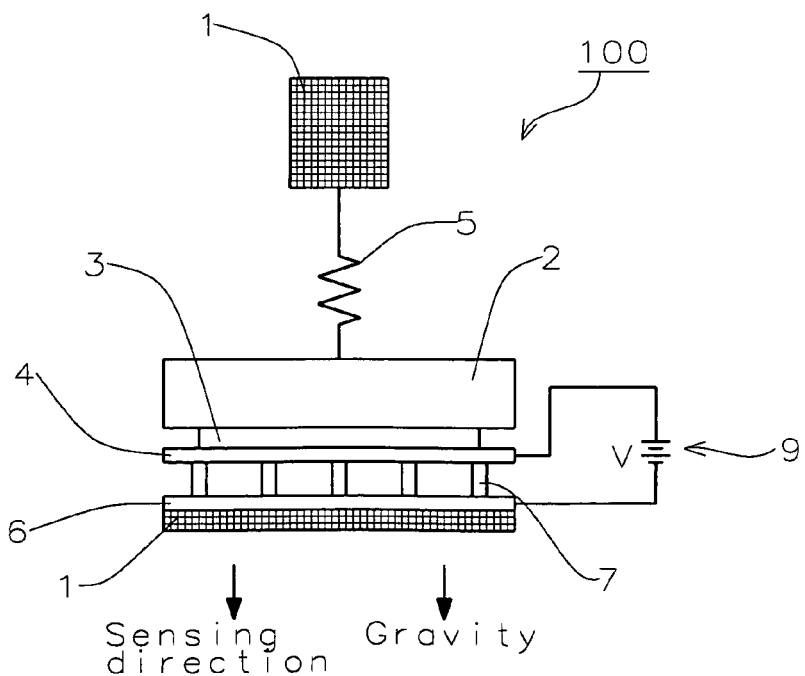

FIGS. 1A and 1B are the schematic diagrams of a G-switch embodiment configured as a G-switch turned off in the horizontal direction and turned on in the vertical direction according to an exemplary embodiment of the present invention. The horizontal direction is any direction which is perpendicular to the direction of gravity. The G-switch is designed to detect the gravity and its components. In FIG. 1A, the sensing direction of the switch is perpendicular to gravity, so it is open. And in FIG. 1B, the sensing direction of the switch is in the same direction as gravity, so it is closed.

In FIG. 1A, a proof mass 2 is connected to a substrate 1 with a spring 5. Actuator driving stages are servomechanism driving stages that supply and transmit a measured amount of energy for the operation of another mechanism or system. The actuator driving stages of the invention consist of fixed driving stages on the substrate and moveable driving stages. Usually, moveable driving stages are connected to the substrate with the springs or beams. A moveable driving stage 4 is attached to the proof mass through beams 3. The driving stage 6 is a fixed stage that is fixed on the substrate 1.

There are some bumps 7 on the fixed or moveable driving stage. The bumps may be on either the fixed driving stage 4 or the moveable driving stage 6 or on both the fixed and moveable driving stages.

A working voltage V is applied by a voltage control circuit between the fixed driving stage 4 and moveable driving stage 6. The G-switch 100 according to an exemplary embodiment of the present invention has a working voltage applied between the moveable driving stage 4 attached to the mass 2 and the fixed driving stage 6 attached to the substrate 1. The dynamic behavior of the proof and the driving stages depends on the applied working voltage, the spring constant of the spring 5, and the rest position of the proof mass 2.

Here, the proof mass 2 and the driving stage 4 move in the orientation sensitive, or sensing direction, of the G-switch, which is perpendicular to the substrate 1, by electrostatic force between the moveable driving stage 4 and the fixed driving stage 6. When the applied voltage increases, the moveable driving stage 4 comes closer to the fixed driving stage 6. Once a critical voltage is achieved, the electric force becomes dominant with respect to the restoring force due to the gravity and the restoring force of spring 5, and the moveable driving stage 4 will collapse and stick to the fixed driving stage 6, as shown in FIG. 1B. This critical voltage is called the static snap-in voltage. For a different rest position of the proof mass 2, the value of the critical voltage is different. On the other hand, for a certain critical voltage, there is a corresponding rest position of the proof mass 2, which is determined by the restoring force of spring 5 and the angle between the orientation sensitive and the gravity of the proof mass 2. So, for an applied voltage and a certain spring constant of spring 5, modifying the angle between the gravity and the orientation sensitive can result in the snap-in of the moveable driving stage 4 onto the fixed driving stage 6.

As there are bumps 7 between the moveable driving stage and the fixed driving stage, after snap-in, the moveable driving stage rests on the bumps 7. The G-switch 100 is on and the electrostatic force is determined by the height of bumps 7. The electrostatic force can be reduced by decreasing the applied voltage while keeping the moveable driving stage 4 still resting on the fixed driving stage 6.

To keep the moveable driving stage 4 on the fixed driving stage 6, the electrostatic force between the driving stages should be larger than the restoring force of spring 5. Once the critical angle between the gravity and the orientation sensitive is larger than a certain value, the restoring force will become dominant and, as a result, the moveable driving stage 4 deviates from the fixed driving stage 6 and the G-switch 100 is turned off, as shown in FIG. 1A. After the switch is turned off and returned to the initial status, the electrostatic force can be increased by changing the applied voltage to the critical voltage for snap-in while keeping the switch open.

The electrostatic force between the moveable driving stage and the fixed driving stage can be expressed in Equation 1.

$$F_E = \frac{1\varepsilon_0}{2} \frac{AV^2}{h^2} \quad \text{[Equation 1]}$$

In Equation 1, $F_E$ denotes the electrostatic force,
$\varepsilon_0$ denotes permittivity of free space,
A denotes the area of the driving stages,
V denotes the voltage applied on driving stages, and
h denotes the distance between the moveable driving stages and fixed driving stage.

Meanwhile, the relationship between the restoring force of the spring and the gravity is expressed in Equation 2 as below.

$$F_m = k\delta - mg\cos\theta \quad \text{[Equation 2]}$$

In Equation 2, $F_m$ denotes restoring force,
k denotes a spring constant,
$\delta$ denotes displacement of the moveable driving stage,
m denotes the value of the proof mass,
g denotes acceleration due to the gravity, and
$\theta$ denotes the angle between the gravity and the orientation sensitive.

Figure 2:
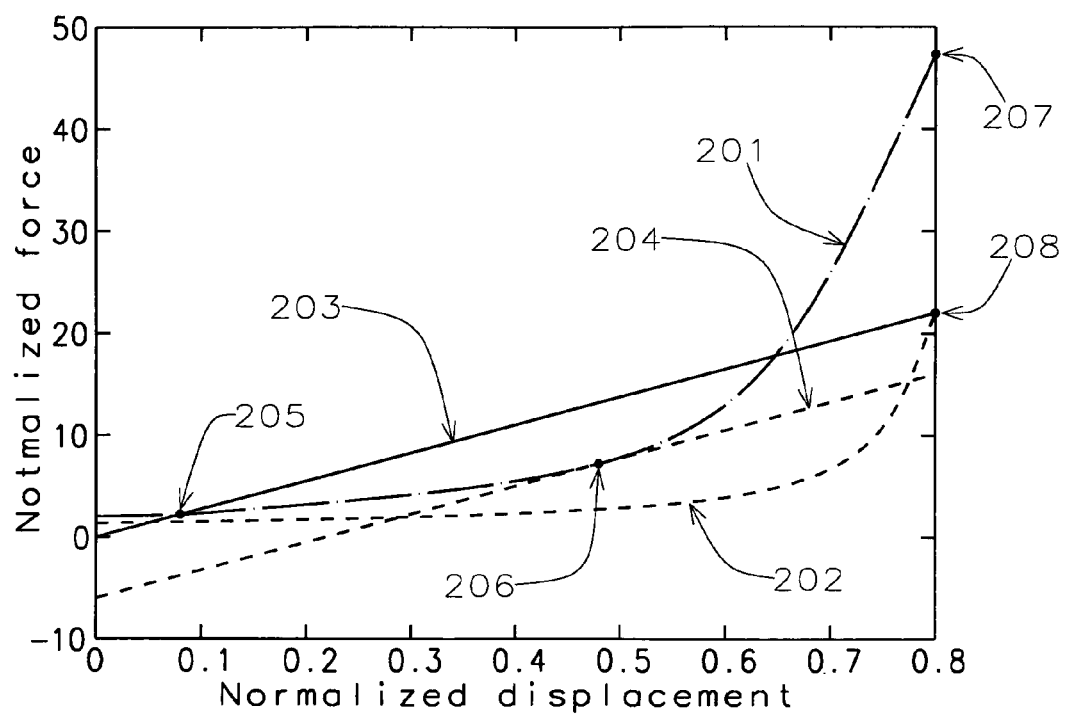
FIG. 2 is a graphical representation of the working status of the G-switch according to the first preferred embodiment of the present invention.

FIG. 2 is a graphical representation of the status of the G-switch 100 according to the preferred embodiments of the present invention according to Equation 1 and Equation 2. In FIG. 2, the horizontal axis stands for the normalized displacement of the moveable driving stage 4. The vertical axis stands for the normalized electrostatic force between the moveable driving stage 4 and the fixed driving stage 6 and the restoring force of spring 5. Referring to Equation 1, the curves 201 and 202 show the electrostatic forces with two different working voltages. Referring to Equation 2, the lines 203 and 204 show the relationship between the restoring force of the spring and the gravity with two different values of $\theta$ (which denotes the angle between gravity and the orientation sensitive).

When a voltage is applied by an external voltage supply, an electrical field will form in the air gap between the driving stages and result in an electrostatic force between the moveable driving stage and the fixed driving stage. For a given bias voltage, there are two values of normalized displacement in FIG. 2. The lower value is the stable equilibrium point, because the derivative of the net force is negative. The higher value is not stable and the net force has a positive derivative at this value.

In FIG. 2, assuming the G-switch is turned off initially, the moveable driving stage (and the proof mass) rests near the stable equilibrium point 205 with a voltage V1 and an inclined angle of θ to gravity. As the inclined angle decreases, the working point of the proof mass moves toward snap-in point 206 along the curve 201. Once the angle between the gravity and the orientation sensitive arrives at a critical angle $θ_1$, the electric force between the driving stages becomes dominant and the snap-in occurs. The working point of the proof mass moves to point 207 rapidly along the curve 201. The moveable driving stage rests onto the fixed driving stage. The G-switch is turned on. Then, the applied voltage is reduced and the working point moves to point 208. Now, once the angle between the gravity and the orientation sensitive increases and arrives at another critical angle $θ_2$, the restoring force becomes dominant, the working point of the proof mass moves back near the point 205, and returns to its initial open status and the G-switch is turned off.

The G-switch shows a much bigger capacitance value when the switch is turned on, compared with a smaller capacitance when the switch is turned off. A simple voltage control circuit can be used to detect the current pulses caused by the variation of the capacitance between the moveable driving stage and the fixed driving stage.

Figure 3A:
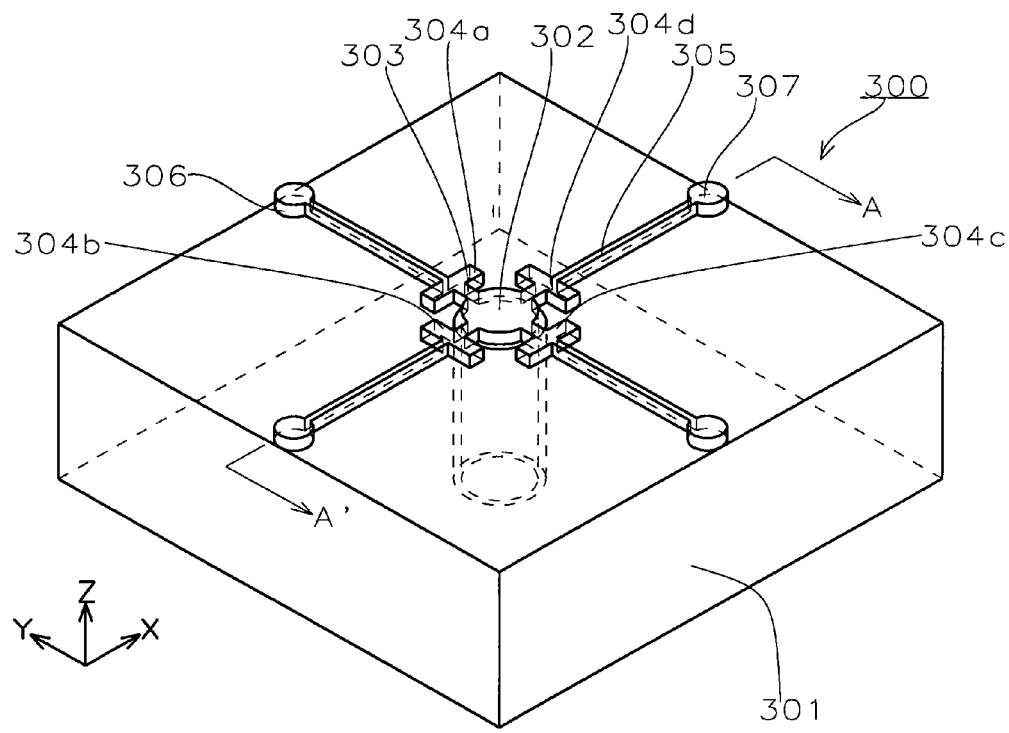
FIGS. 3A and 3B are schematic diagrams and cross-sectional views, respectively, for showing a simple model of a MEMS G-switch according to a second preferred embodiment of the present invention.

A second preferred embodiment of the present invention will be described with reference to FIGS. 3A and 3B. FIG. 3A is an orthogonal view and FIG. 3B is a cross-sectional view showing a simple model of a MEMS G-switch according to the second preferred embodiment of the invention.

In FIG. 3A, a proof mass 302 is located in the center of a substrate 301. The material of the proof mass can be silicon or polysilicon. It can be formed all the way through the substrate or partly through the substrate. The proof mass 302 is supported by wide beams 303 connected to a driving stage 304. The driving stage 304 is located over the substrate 301 supported by a beam 305 extended from four anchors 306, the anchors 306 supporting the beams 305. The driving stage 304 is provided with driving electrodes 304a, 304b, 304c and 304d in four symmetrical orientations and the proof mass 302 is connected between the driving electrodes 304a, 304b, 304c and 304d. The beams 303 and beams 305 also act as signal lines for switching and are connected to the contact sections 307 on the anchors 306. Here, the substrate 301 is also used as a common fixed electrode under driving electrodes 304a, 304b, 304c and 304d.

Figure 3B:
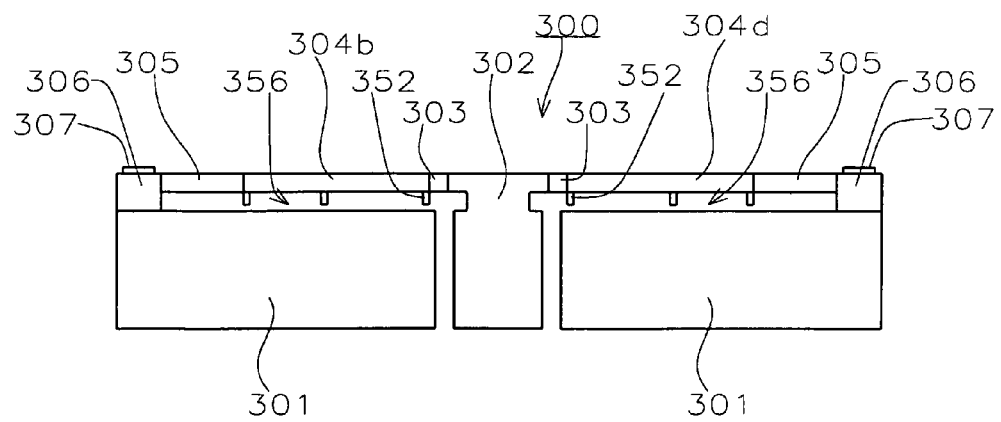

FIG. 3B is a schematic diagram that provides a close-up view of the interface comprising the beams, the electrodes, the gaps, and the bumps shown along the cross-section A-A' of FIG. 3A. In FIG. 3B, anchors 306 are shown on the substrate 301; electrodes 304 which are suspended by beam members 303 are connected to proof mass 302. The electrodes 304 are also connected to the anchors 306 by beams 305. The gaps between the moveable electrodes 304 and the fixed electrode 301 are denoted by 356. Bumps 352, which are made of a nonconductive material such as polysilicon, are attached to either the moveable electrodes 304, as shown in the figure, or to the fixed electrode, or to both fixed and moveable electrodes.

The G-switch 300 according to the second preferred embodiment of the present invention has a voltage applied by a voltage control circuit to the driving electrodes. The mass 302 and the driving electrodes move in the Z direction which is perpendicular to the substrate 301 by electrostatic force between the driving electrodes 304a, 304b, 304c and 304d and common fixed electrode 301. When the applied voltage increases, the driving electrodes 304a, 304b, 304c and 304d come closer to the common fixed electrode 301. Once a critical voltage is achieved, the electrostatic force becomes dominant with respect to the mechanical force and the driving electrodes 304a, 304b, 304c and 304d will press onto the fixed common electrode, here substrate 301.

When the switch is open, the restoring force of the beams 305 is equal to the electrostatic force of electrodes 304. The stage in closing the switch is to reduce the angle between the gravity and the orientation sensitive, or sensing direction. As the angle θ becomes smaller, due to the component of the gravity of the proof mass in the Z-direction, the electrodes 304 come closer to the substrate 301. Once a critical rest position of the proof mass 301, and thus the rest position of the electrodes 304, is achieved (referring to Equation 2), the rest position of the electrodes 304 and the proof mass 302 corresponds to an angle $θ_1$, the electrostatic force becomes dominant, snap-in occurs, and the electrodes 304 collapse and stick onto the substrate 301. Referring to Equation 1 and Equation 2, the snap-in voltage of the electrodes is $V_1$. The critical rest position corresponding to the angle $θ_1$ shows a restoring force $F_{m1}$ and the electrodes with applied voltage of $V_1$ show an electrostatic force $F_{E1}$. As there are bumps 352 under electrodes 304, the electrodes 304 rest on the bumps. The G-switch 300 is on and the electrostatic force is determined by the height of bumps 352. After the G-switch is turned on, the electrostatic force is decreased by changing the applied voltage from $V_1$ to $V_2$, while keeping the electrodes 304 still at rest on the substrate 301.

To keep the electrode 304 onto the substrate 301, electrostatic force $F_{E2}$ should be larger than the restoring force $F_{m2}$. Referring to Equation 2, there is a critical angle $θ_2$. Once the angle between the gravity and the orientation sensitive is larger than $θ_2$, the restoring force $F_{m2}$ will become dominant, and as a result, the electrodes 304 deviate from substrate 301 and the G-switch 300 is open. This turns the switch off and returns it to its initial status. Referring to Equation 1, the electrostatic force can be increased by changing the applied voltage from $V_2$ to $V_1$ while keeping the switch open.

Figure 4A:
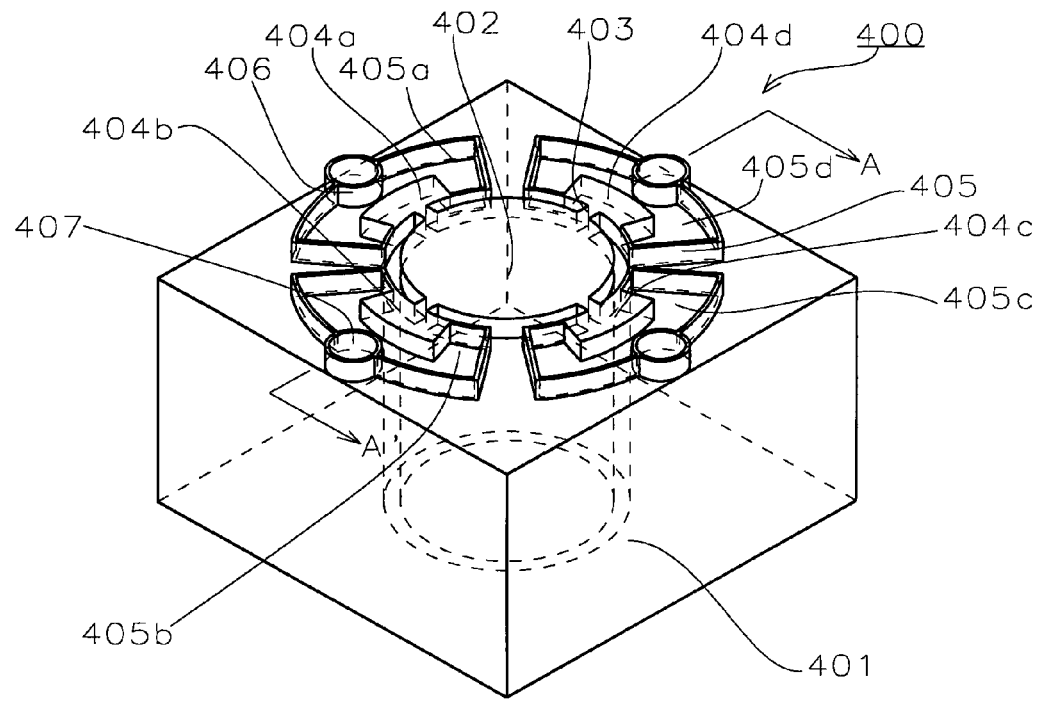
FIG. 4A and FIG. 4B are schematic diagram and cross-sectional views, respectively, for showing a simple model of a MEMS G-switch according to a third preferred embodiment of the present invention.
Figure 4B:
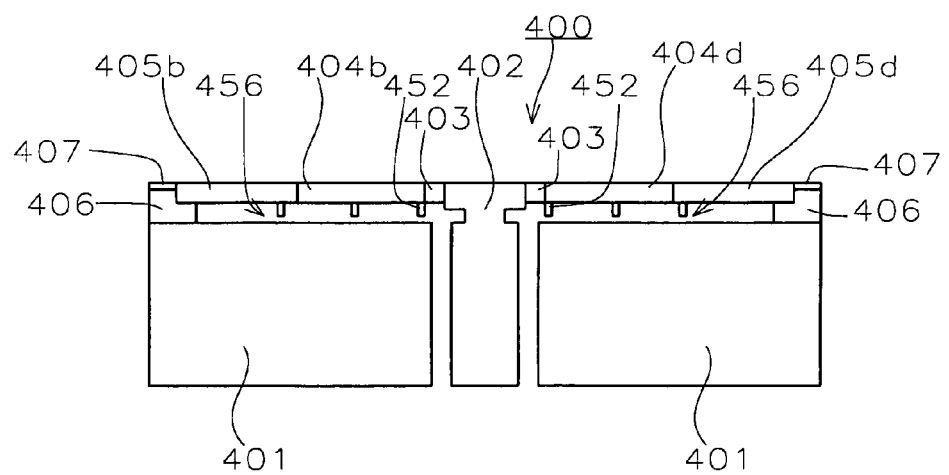

A third preferred embodiment of the present invention will be described with reference to FIGS. 4A and 4B. FIG. 4A is an orthogonal view and FIG. 4B is a cross-sectional view across A-A' of FIG. 4A showing a simple model of a MEMS G-switch according to the third preferred embodiment of the invention. The G-switch 400 includes the substrate 401, the proof mass 402, electrodes 404a-404d, and support members 405. Preferably, here, the proof mass 402 and electrodes 404 are shown supported by a U-type beam 405a-405d suspended above the surface of the substrate, as shown by the gap 456 in FIG. 4B. The U-type beam 405a-405d formed by cambered beams is connected to anchors 406. The bumps 452 are under the electrodes 404. When the G-switch 400 is inclined, there is an in-plane component of gravity. Compared with other kinds of beams, U-type beams of the present invention show smaller cross-talk caused by the in-plane component of gravity. Furthermore, with a U-type beam, the stability and reliability of the G-switch and the operating factor of the wafer are both improved.

The operation of the G-switch of this embodiment is the same as described above in the second embodiment.

It should be emphasized that in the above-described embodiments of the present invention, preferred embodiments are merely possible examples of implementations based on the principles of the MEMS G-switch of the present invention set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A MEMS G-switch comprising:
a silicon substrate;
a proof mass;
one or more moveable driving stages attached to said proof mass;
a plurality of mechanical springs each having one end attached to said substrate and another end attached to said one or more moveable driving stages;
one or more fixed driving stages attached to said substrate;
bumps attached on said moveable driving stages or said fixed driving stages; and
a voltage control circuit applying voltage between said moveable driving stages and said fixed driving stages wherein said G-switch is turned off when it is in an orientation perpendicular to the direction of gravity and said one or more moveable driving stages deviate from said one or more fixed driving stages, and wherein said G-switch is turned on when it is in an orientation parallel to the direction of gravity and the gravity force of said proof mass pulls said one or more moveable driving stages to collapse onto said one or more fixed driving stages.

2. The MEMS G-switch according to claim 1, wherein said proof mass is suspended onto said substrate by said plurality of mechanical springs.

3. The MEMS G-switch according to claim 1, wherein said one or more moveable driving stages comprise driving electrodes which are connected to said voltage control circuit.

4. The MEMS G-switch according to claim 1, wherein said substrate acts as said one or more fixed driving stages and wherein said bumps are on a bottom surface of said one or more moveable driving stages over a top surface of said substrate.

5. The MEMS G-switch according to claim 2, wherein each of said plurality of mechanical springs have one end connected to said one or more moveable driving stages and another end connected to a plurality of anchors on said substrate.

6. The MEMS G-switch according to claim 1, wherein when said MEMS G-switch is turned off, a first working voltage is applied to said one or more moveable driving stages and the electrostatic force generated from said first working voltage and the gravity force of said proof mass pulls said one or more moveable driving stages to collapse onto said one or more fixed driving stages, thereby turning on said MEMS G-switch.

7. The MEMS G-switch according to claim 6, wherein said voltage control circuit applies a second working voltage to said one or more moveable driving stages when said one or more moveable driving stages collapse onto said one or more fixed driving stages.

8. The MEMS G-switch according to claim 1, wherein said G-switch is turned on by:
providing said G-switch in an open position with a first working voltage applied to said moveable driving stages by said voltage control circuit;
moving of said one or more moveable driving stages' sensing direction towards gravity at a first critical angle, whereby said moveable driving stages collapse and stick to said fixed driving stages through said bumps thereby turning on said G-switch; and
reducing said first working voltage to a second working voltage to keep said moveable driving stages sticking to said fixed driving stages.

9. The MEMS G-switch according to claim 8, wherein the angle between said one or more moveable driving stages' sensing direction and gravity of said proof mass decreases to a first critical angle and said MEMS G-switch turns on.

10. The MEMS G-switch according to claim 1 wherein said G-switch is turned off by:
applying a second working voltage to said moveable driving stages by said voltage control circuit; and
moving of said one or more moveable driving stages' sensing direction away from gravity to a second critical angle, wherein said moveable driving stages deviate from said fixed driving stages thereby turning off said G-switch.

11. The MEMS G-switch according to claim 10, wherein the angle between said one or more moveable driving stages' sensing direction and gravity of said proof mass increases to a second critical angle and said MEMS G-switch turns off.

12. A MEMS G-switch comprising:
a substrate;
a proof-mass;
a fixed driving stage attached to said substrate;
a plurality of mechanical springs;
a moveable driving stage attached to said proof mass and suspended above said substrate by said plurality of mechanical springs;
a voltage control circuit applying working voltage to said moveable and fixed driving stages; and
a bump attached between said fixed and said moveable driving stages;
wherein, when said MEMS G-switch is turned off, a first working voltage is applied to said moveable driving stage, thereby moving said moveable driving stage's sensing direction towards gravity at a first critical angle, thereby causing said movable driving stage to touch said fixed driving stage through said bump, and thereby turning on said MEMS G-switch; and
wherein, when said MEMS G-switch is turned on, a second working voltage is applied to said moveable driving stage, thereby moving said moveable driving stage's sensing direction away from gravity at a second critical angle, thereby causing said movable driving stage to separate from said fixed driving stage, and thereby turning off said MEMS G-switch.

13. The MEMS G-switch according to claim 12, wherein application of said first and second working voltages is performed by said voltage control circuit.

14. The MEMS G-switch according to claim 12, wherein said first working voltage is higher than said second working voltage.

15. The MEMS G-switch according to claim 12, wherein said first critical angle to turn on said MEMS G-switch is smaller than said second critical angle to turn off said MEMS G-switch.

16. A MEMS G-switch comprising:
a substrate;
a proof-mass;
one or more moveable driving stages attached to said proof mass;
a plurality of mechanical springs each having one end attached to said substrate and another end attached to said moveable driving stages;
one or more fixed driving stages attached to said substrate;
bumps attached on said fixed driving stages or said moveable driving stages; and a voltage control circuit applying voltage between said moveable driving stages and said fixed driving stages;

wherein, when a sensing direction of said one or more moveable driving stages is moved away from gravity at a second critical angle, said one or more moveable driving stages are separated from said one or more fixed driving stages and a first working voltage is applied to them by said voltage control circuit, and said MEMS G-switch is turned off; and wherein, when a sensing direction of said one or more moveable driving stages is moved towards gravity at a first critical angle, said one or more moveable driving stages touch said fixed driving stages through said bumps and a second working voltage is applied to them by said voltage control circuit, and said MEMS G-switch is turned on.

17. A method for manufacturing a MEMS G-switch comprising:

providing a substrate;

forming a proof-mass in or above said substrate;

providing one or more fixed driving stages attached to said substrate;

attaching one or more moveable driving stages to said proof mass;

providing a plurality of mechanical springs to suspend said one or more moveable driving stages above said substrate;

providing one or more bumps attached between said fixed and said moveable driving stages; and providing a voltage control circuit to control two working voltages applied to said one or more driving stages alternatively wherein said G-switch is turned off when it is in an orientation perpendicular to the direction of gravity and said one or more moveable driving stages deviate from said one or more fixed driving stages and wherein said G-switch is turned on when it is in an orientation parallel to the direction of gravity and the gravity force of said proof mass pulls said one or more moveable driving stages to collapse onto said one or more fixed driving stages.

18. The method according to claim 17 wherein said step of providing a plurality of mechanical springs to suspend said one or more moveable driving stages above said substrate comprises:

attaching said one or more mechanical springs between said proof-mass and said substrate.

19. The method according to claim 17 wherein said step of providing a plurality of mechanical springs to suspend said one or more moveable driving stages above said substrate comprises:

connecting first beams between said proof-mass and said one or more moveable driving stages; and connecting second beams between each of said one or more moveable driving stages and an anchor attached to said substrate.

20. The method according to claim 19 wherein said one or more moveable driving stages comprise driving electrodes which also act as signal lines for switching.

21. The method according to claim 19 wherein said substrate acts as said one or more fixed driving stages and wherein said bumps are on a bottom surface of said one or more moveable driving stages or on a top surface of said substrate.

22. The method according to claim 19 wherein said step of providing a plurality of mechanical springs to suspend said one or more moveable driving stages above said substrate comprises:

supporting said proof-mass and said one or more moveable driving stages on one or more U-shaped beams connected to said substrate by anchors.

23. A MEMS G-switch comprising:

a substrate;

a proof-mass formed through said substrate wherein a top surface of said substrate forms a fixed driving stage;

one or more movable driving stages located over said top surface of said substrate and connected by first beams to said proof-mass wherein second beams are connected between each of said one or more moveable driving stages and an anchor attached to said top surface of said substrate;

a voltage control circuit applying working voltage to said moveable driving stages; and a bump attached between said fixed and said moveable driving stages;

wherein, when said MEMS G-switch is turned off, a first working voltage is applied to said one or more moveable driving stages, thereby moving said moveable driving stage's sensing direction towards gravity at a first critical angle, thereby causing said one or more movable driving stage to touch said fixed driving stage through said bump, and thereby turning on said MEMS G-switch; and wherein, when said MEMS G-switch is turned on, a second working voltage is applied to said one or more moveable driving stages, thereby moving said one or more moveable driving stages' sensing direction away from gravity at a second critical angle, thereby causing said one or more movable driving stages to separate from said fixed driving stage, and thereby turning off said MEMS G-switch.

24. The MEMS G-switch according to claim 23 wherein said proof mass is formed fully or partially through said substrate.

25. The MEMS G-switch according to claim 23 wherein said four movable driving stages are located symmetrically around said proof mass.

26. The MEMS G-switch according to claim 23 wherein said first and second beams also act as signal lines for switching and are connected to contact sections on said anchors.

27. The MEMS G-switch according to claim 23 wherein said one or more moveable driving stages comprise driving electrodes and wherein said substrate acts as a common fixed electrode under said driving electrodes.

28. The MEMS G-switch according to claim 23 wherein said bumps are on a bottom surface of said one or more moveable driving stages or on a top surface of said substrate.

29. The MEMS G-switch according to claim 23 wherein said second beams are U-type beams formed by cambered beams connected to said anchors.

* * * * *